Dec. 6, 1927.

R. B. BUTTERBAUGH

POWER TRANSMISSION MECHANISM

Filed May 17, 1926

INVENTOR
RALPH B. BUTTERBAUGH

By Paul, Paul & Moore
ATTORNEYS

Dec. 6, 1927.                                              1,651,371
R. B. BUTTERBAUGH
POWER TRANSMISSION MECHANISM
Filed May 17, 1926                    2 Sheets-Sheet 2

INVENTOR
RALPH B. BUTTERBAUGH
ATTORNEYS

Patented Dec. 6, 1927.

1,651,371

UNITED STATES PATENT OFFICE.

RALPH B. BUTTERBAUGH, OF PRESCOTT, WISCONSIN, ASSIGNOR, BY DIRECT AND MESNE ASSIGNMENTS, OF ONE-HALF TO EDWARD TOBIAS, OF PRESCOTT, WISCONSIN, AND ONE-HALF TO J. F. MAIN AND SAMUEL J. BARR, BOTH OF MINNEAPOLIS, MINNESOTA.

POWER-TRANSMISSION MECHANISM.

Application filed May 17, 1926. Serial No. 109,627.

This invention relates to an improved power transmission mechanism, particularly adapted for use to transmit reciprocal motion to a driven member, and more particularly relates to such a mechanism adapted for use to operate the usual connecting rod of a pump.

An object of the invention is to provide a power transmission mechanism comprising an oil-tight casing, having means for adjustably securing it to the usual tubular member or standard of a pump, and having a pair of oscillating arms operatively connected together for simultaneous operation, said arms having means for connecting them to the usual pump rod whereby, when the mechanism is operated, reciprocal motion will be transmitted to the pump rod.

A further object of the invention is to provide such a mechanism including a pair of rockshafts mounted in spaced relation and operatively connected together by a pair of gear segments, each rockshaft having an oscillating arm terminally secured thereto, and means connecting it with a pump rod or other reciprocal member, the driving means for said rockshafts having means co-operating therewith to counter-act outward thrust in the rockshaft bearings, caused by the usual tendency of the gear teeth operatively connecting said rockshafts, to separate the rockshafts when the mechanism is operating under load.

A further object is to provide a power transmission mechanism for operating a pump rod, comprising an oil-tight casing in which the operating mechanism is mounted, thereby providing a mechanism with all the working parts thereof concealed, with the exception of the oscillating arms connected to the pump rod, thereby rendering such mechanism safe and fool-proof in operation.

A further object is to provide a power transmission mechanism including a pair of oscillating arms adapted to be connected to the usual pump rod at points diametrically opposite with respect thereto, whereby all side strains will be eliminated from the pump rod, said mechanism being of simple and inexpensive construction, whereby it may be manufactured at a minimum cost.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the selected embodiment of the invention here shown, for purposes of disclosure, there is illustrated a portion of a pump comprising the usual tubular member or standard 5 having a pump rod 6 reciprocally mounted therein in the usual manner. A Thead 7 is terminally mounted upon the pump rod 6 and secured thereto by means of a pin 8.

Figure 2:
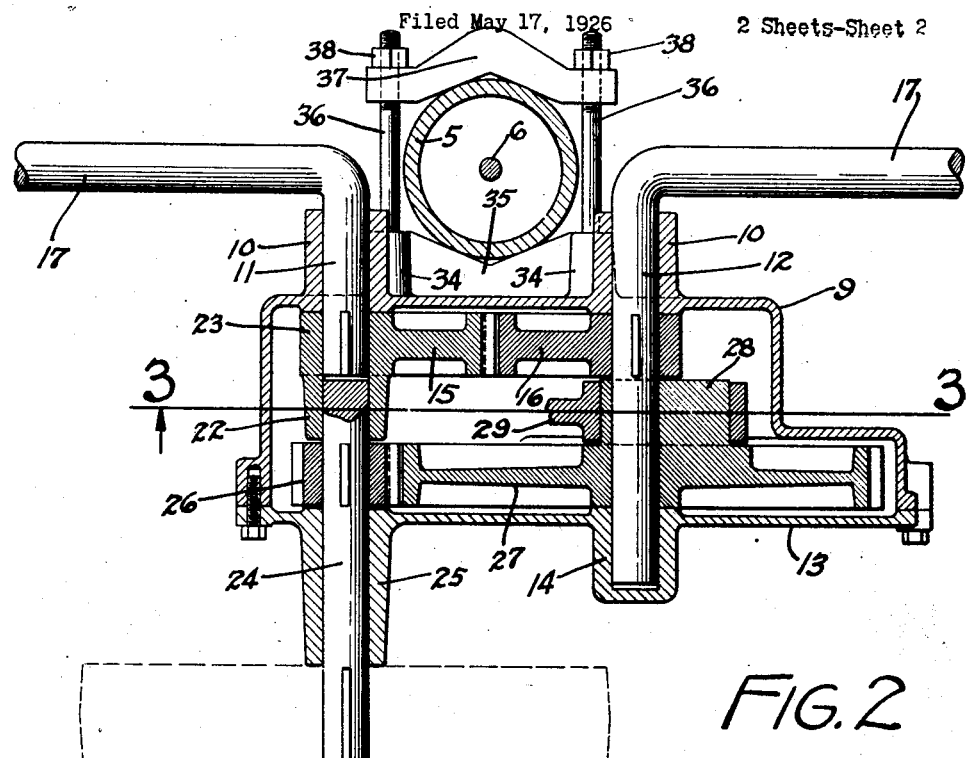
Figure 2 is an enlarged horizontal plan view on the line 2—2 of Figure 3.

The novel power transmission mechanism featured in this invention comprises a casing 9 having journals 10 adapted to receive a pair of rockshafts 11 and 12, as particularly shown in Figure 2. A cover-plate or closure 13 is demountably secured to one side of the casing 9, whereby access may be had to the interior of the casing. A journal 14 is provided in the cover-plate 13 adapted to support one end of the rockshaft 12. Intermeshing gear segments 15 and 16 are secured, respectively, to the shafts 11 and 12 to provide means for operatively connecting together the two rockshafts, whereby they may be simultaneously operated in opposite directions.

Oscillating arms 17 are terminally secured to the rock-shafts 11 and 12. These arms may be either integrally formed with the shafts, as shown in Figure 2, or, if desired, they may be independently formed and secured to the shafts. Split pivot blocks 18 are adjustably secured to the oscillating arms 17 by means of lock screws 19. Rods 21 operatively connect the pivot blocks 18 with the T-head 7, at the upper end of the pump rod 6, whereby, when the arms 17 are oscillated, a reciprocal motion will be transmitted to the pump rod. The adjustability of the pivot blocks 18 upon the arms 17 provides means whereby the stroke of the mechanism may be varied to adapt it to the stroke of the pump rod.

A hub 22 is provided upon the hub 23 of the gear segment 15 and is axially bored to rotatively receive one end of a drive shaft 24, having its intermediate portion rotatively mounted in a journal 25, provided in the cover-plate 13. A drive pinion 26 is secured to the drive shaft 24, and meshes with a gear 27 rotatively mounted upon the rockshaft 12. (See Figure 2.) An eccentric 28 is provided upon one side of the gear wheel 27, and has one end of a connecting rod or pitman 29 rotatively mounted thereon, the other end of which is pivotally connected to a crank arm 31 by means of a shouldered stud 32. The crank arm 31 is preferably integrally formed upon the hub 23 of the gear segment 15.

Thus when the drive shaft 24 is rotated, the gear 27 will be rotated upon the rockshaft 12, thereby causing the eccentric 28 to actuate the connecting rod 29, which, as a result of its connection with the gear segment 15, by means of the crank arm 31 and shouldered stud 32, will cause the rock shaft 11 to be rocked in the journal 10 with the resultant oscillation of the arm 17 secured thereto. Such rocking of the shaft 11 will impart a similar movement to the rock shaft 12, as result of its geared connection therewith by means of the gear segments 15 and 16. The hub 22 of the gear segment 15 provides a means for supporting the inner end of the drive shaft 24, and the latter in turn provides a supporting means for the inner end of the rockshaft 11, as result of such connection. A suitable pulley 33, shown in dotted lines in Figure 2, may be secured to the outer end of the drive shaft 24 to provide means for transmitting power thereto from a power device such, for instance, as an internal combustion engine or a motor.

Figure 3:
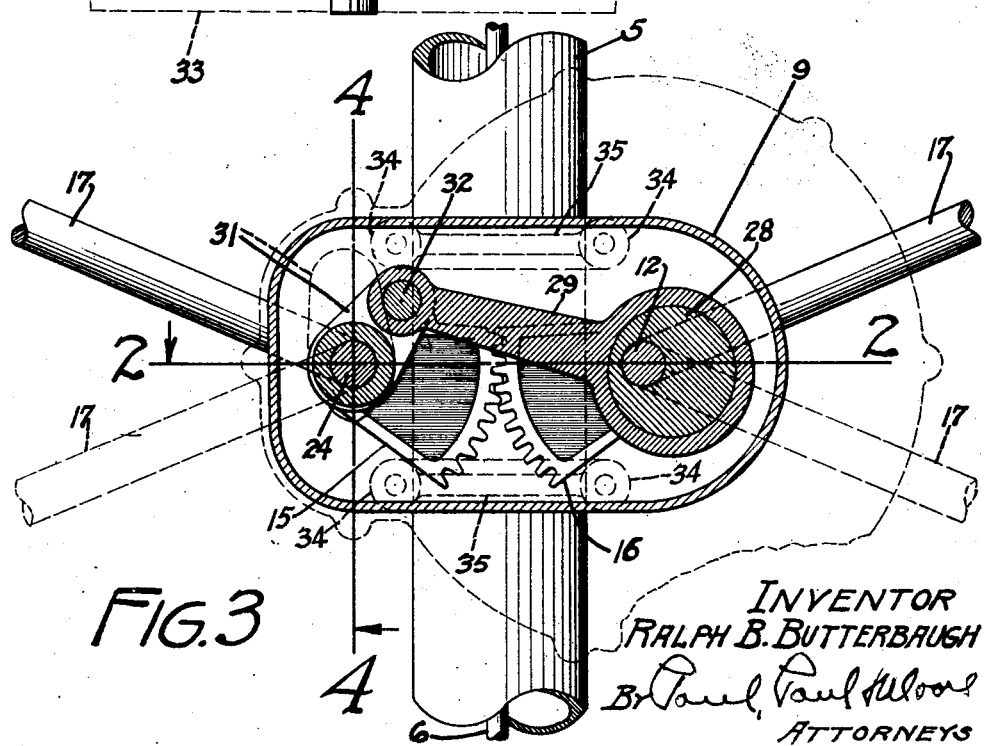
Figure 3 is a vertical sectional view on the line 3—3 of Figure 2, showing the driving connection between the rockshafts.

An important feature of this invention resides in the construction and arrangement of the parts above described, particularly the location of the crank arm 31. As shown in Figure 3, it will be noted that the crank arm 31 is mounted to operate above the horizontal center line of the two rockshafts 11 and 12. Thus when the mechanism is operated, and the connecting rod is actuated by the eccentric 28 to oscillate the crank arm 31, the connecting rod 29 will be under tension during the power or lifting stroke of the oscillating arms 17. By thus causing the connecting rod 29 to be under tension while operating the oscillating arms to lift the pump rod, the force exerted in the connecting rod will tend to pull the two rockshafts closer together, thereby substantially counteracting the force exerted in the journals tending to spread apart the shafts, caused by the driving connection of the teeth of the two gear segments. It is well known in the operation of gears of this type, that as the gear teeth become worn, the pressure exerted against the teeth, when operating under heavy load, has a tendency to spread apart their supporting shafts. Thus, by mounting the crank arm 31 as above described, this tendency to spread apart the shafts will be counteracted by the action of the connecting rod 29 tending to pull the two rockshafts closer together. It has been found in actual practice, that by mounting the parts as above described, the useful life of the gear teeth of the segments 15 and 16 will be greatly prolonged.

Figure 1:
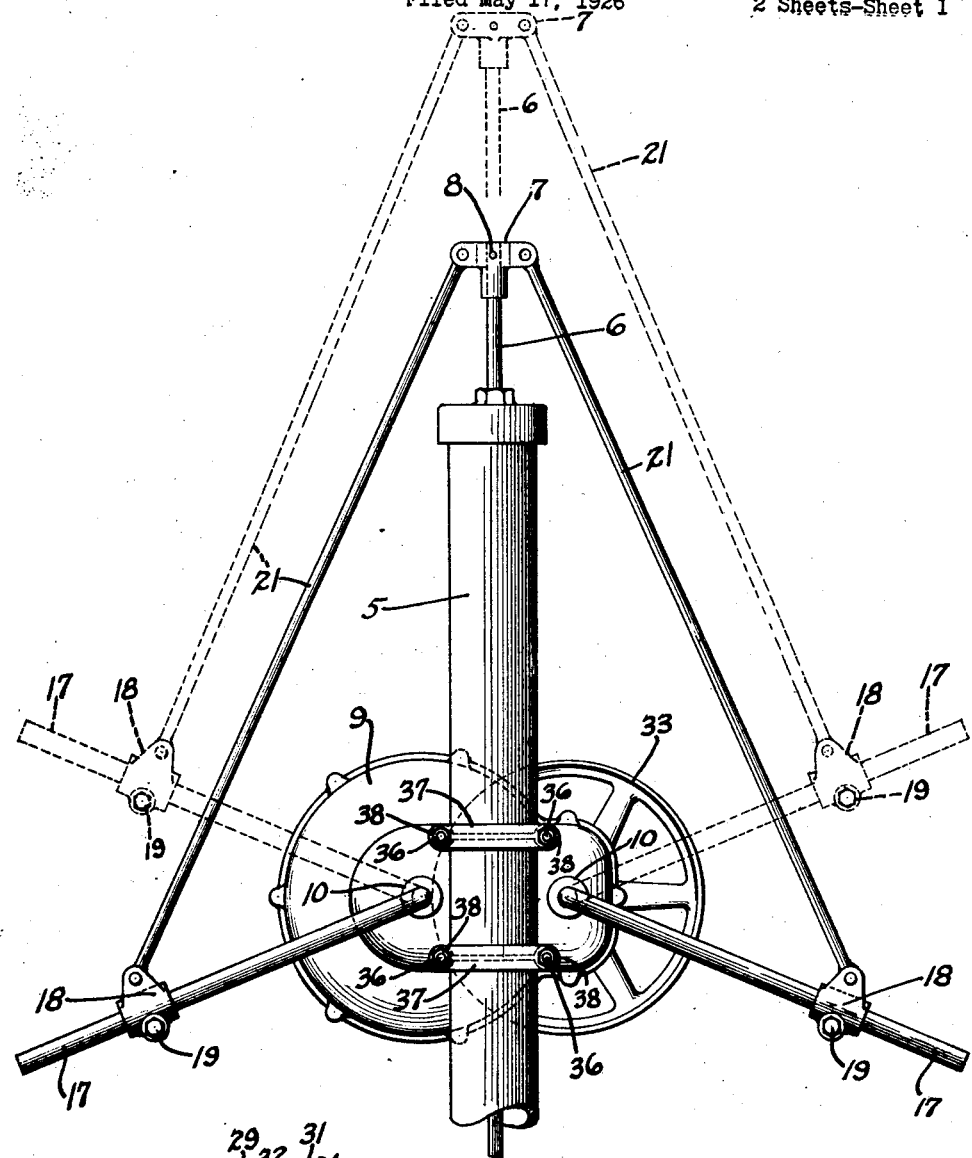
Figure 1 is a diagrammatic view showing a portion of a pump standard having the improved power transmission mechanism mounted thereon and operatively connected to the usual pump rod thereof.
Figure 4:
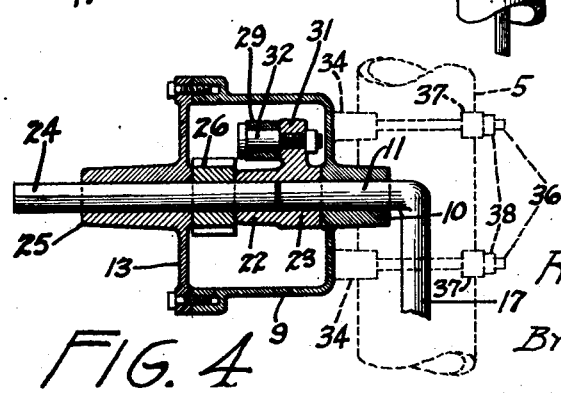
Figure 4 is a detailed sectional view on the line 4—4 of Figure 3.

Means are provided upon the casing 9 for adjustably securing it to the pump standard 5, as shown in Figures 1 and 2. Such means preferably consists in the provision of a plurality of bosses 34 integrally formed upon the rear wall of the casing and outwardly extending therefrom. A V-shaped web 35 is provided between the upper bosses 34, and a similar web 35 is provided between the lower bosses. These webs 35 are adapted to engage the pump standard 5, as shown in Figure 2. Threaded studs 36 are mounted in the bosses 34 and have clamping members 37 mounted thereon adapted to engage the standard 5 to adjustably and clampingly secure the pump casing thereto. Nuts 38 are terminally mounted upon the studs 36 to clamp the members 37 against the pump standard 5.

This novel power transmission mechanism may therefore readily and quickly be mounted upon the tubular member or standard of an ordinary pump. When mounted thereon, the oscillating arms 17 will be substantially in alinement with the axis of the pump rod 6, thereby relieving the pump rod of side strains, which also is accomplished as result of providing two oscillating arms and connecting them to the pump rod diametrically opposite with respect thereto, as shown in Figure 1. The casing 9 and the cover-plate 13 also provide an oil-tight housing in which the driving mechanism is contained, thereby preventing dirt and foreign matter from coming in contact therewith with its usual detrimental results and eliminating the usual danger prevalent with devices of this type of having the operating mechanism thereof exposed. By means of the adjustably mounted pivot blocks, mounted upon the oscillating arms 17, the stroke of the mechanism may be varied to suit that of the reciprocal member to be driven or operated thereby, thus providing such a device well adapted for use to operate an ordinary pump rod and which device may also be used for operating other devices where a reciprocal movement is required.

I claim as my invention:

1. A device of the class described, comprising in combination, spaced rockshafts geared together for simultaneous movement, an eccentric on one of said shafts, a pitman connecting the eccentric with the other of said shafts for transmitting power thereto, said pitman arranged to be under tensional strain during its power stroke, thereby tending to hold the gears of the rockshafts in close intermeshing relation.

2. A device of the class described comprising in combination, a pair of spaced rockshafts, intermeshing gear segments secured to said rockshafts, an eccentric rotatably mounted upon one of the shafts, a crank arm secured to the other shaft, and a pitman connecting the eccentric with the crank arm and adapted to transmit power thereto to rock the shafts during its tension stroke.

3. A device of the class described, comprising in combination, spaced rockshafts geared together for simultaneous movement, oscillating arms secured to said rockshafts and having a connection with a reciprocal member, an eccentric mounted on one of said shafts, a pitman operatively connecting the eccentric with the other of said shafts for transmitting power thereto, said pitman arranged to exert its power stroke while under tensional strain, thereby exerting an inward force upon the rockshafts to hold the gears thereof in close intermeshing relation during the working stroke of said arms.

4. A device of the class described, comprising in combination, a pair of spaced rockshafts, one of the shafts being longer than the other, an eccentric rotatably mounted upon the longer shaft and having a connection with a driving means, a gear segment on said longer shaft, a crank arm secured to the shorter shaft, a gear segment also secured to the shorter shaft for transmitting power to the other shaft, and a pitman connecting the eccentric with the crank arm for transmitting power thereto, from the eccentric.

5. A device of the class described, comprising in combination, a pair of rockshafts mounted in spaced parallel relation, journals therefor, gear segments connecting together said rockshafts for simultaneous operation and whereby said shafts will be operated in opposite directions, oscillating arms secured to said shafts and having connections with a reciprocating member, an eccentric rotatably mounted upon one of said rockshafts, a crank arm secured to the other of said shafts and having a connection with the eccentric, a gear drive for said eccentric, and said eccentric and said crank arm being mounted to counteract lateral thrust in said journals caused by said gear segments during the working stroke of said oscillating arms.

6. A device of the class described, comprising in combination, a pair of rockshafts mounted in spaced parallel relation and having intermeshing gear segments connecting them together for simultaneous operation, oscillating arms secured to said shafts and having connections with a reciprocating member, an eccentric rotatably mounted upon one of said rockshafts, a crank arm secured to the other of said shafts, a connecting rod operatively connecting together said eccentric and said crank arm, means for operating said eccentric to actuate said connecting rod, and said connecting rod being adapted to be under tension during the working stroke of said oscillating arms, thereby exerting an inward thrust on said rockshafts substantially counter-acting the outward thrust exerted thereagainst by the intermeshing engagement of the teeth of said gear segments.

7. A device of the class described, comprising in combination, a pair of spaced rockshafts, means operatively connecting together said rockshafts and adapting them for simultaneous operation, an eccentric rotatably mounted upon one of said rockshafts, a crank arm secured to the other of said shafts, a pitman connecting the eccentric with the crank arm for transmitting power thereto, and means for operating said eccentric to simultaneously rock said shafts.

8. A device of the class described, comprising in combination, a pair of spaced rockshafts having intermeshing gear segments secured thereto and adapted to simultaneously operate said shafts in opposite directions, oscillating arms secured to said rockshafts and adapted to transmit reciprocal motion to a member, an eccentric rotatably mounted upon one of said rockshafts, a crank arm secured to the other of said shafts, a pitman connecting the eccentric with the crank arm for transmitting power thereto, and an operating mechanism for said eccentric device whereby said shafts may be actuated to oscillate said arms.

9. A power transmission mechanism for operating a pump rod, said mechanism comprising an oil-tight casing having means for securing it to a pump standard, a pair of rockshafts mounted in journals in said casing, intermeshing gear segments secured to said shafts and adapted to simultaneously operate said shafts in opposite directions, oscillating arms secured to said rockshafts and having pivotal connections with said pump rod, an eccentric rotatably mounted upon one of said rockshafts, a crank arm mounted upon the other of said shafts and having a connection with said eccentric, a gear and pinion for operating said eccentric, and said eccentric and crank arm being mounted to counteract outward lateral thrust in said journals caused by the driving connection between said segments, when said arms are being oscillated to lift said pump rod.

10. A power transmission mechanism for operating a pump rod, said mechanism comprising an oil-tight casing having means for clampingly securing it to a pump, a pair of rockshafts mounted in said casing and geared together for simultaneous movement, arms secured to said rockshafts and mounted to oscillate exteriorly of said casing, means for pivotally connecting said arms with said pump rod in diametrically opposite relation thereto, an eccentric device connected with said rockshafts and adapted to exert an inward force against said rockshafts to prevent spreading thereof during the working stroke of said arms, a drive shaft also mounted within said casing and having a geared connection with said eccentric device, and means exteriorly of said casing for rotating said drive shaft.

In witness whereof, I have hereunto set my hand this 12th day of May, 1926.

RALPH B. BUTTERBAUGH.